United States Patent [19]
Ehn, Jr.

[11] Patent Number: 6,131,379
[45] Date of Patent: Oct. 17, 2000

[54] REEL-TYPE LAWN MOWER AND TRACTOR ASSEMBLY AND METHOD FOR REDUCING LATERAL TILTING MOMENT ON THE MOWER

[75] Inventor: Byron N. Ehn, Jr., Menomonee Falls, Wis.

[73] Assignee: Textron Inc., Providence, R.I.

[21] Appl. No.: 09/240,901

[22] Filed: Jan. 29, 1999

[51] Int. Cl.[7] .......................... A01D 34/03; A01D 34/43; A01D 34/64
[52] U.S. Cl. ..................................... 56/15.7; 56/7; 56/294
[58] Field of Search ............................... 56/7, 15.7, 15.8, 56/15.9, DIG. 3, DIG. 10, 249, 14.7, 294

[56] References Cited

U.S. PATENT DOCUMENTS

| | | | |
|---|---|---|---|
| 1,957,079 | 5/1934 | Ronning | 56/7 |
| 2,637,966 | 5/1953 | Richey | 56/10.4 |
| 3,514,926 | 6/1970 | Heth et al. | 56/7 |
| 3,905,180 | 9/1975 | Akgulian . | |
| 4,723,396 | 2/1988 | Ermacora | 56/13.6 |
| 4,769,976 | 9/1988 | Bassett et al. | 56/7 |
| 4,930,801 | 6/1990 | Gillund | 280/481 |
| 4,956,965 | 9/1990 | Parson, Jr. | 56/15.1 |
| 5,343,680 | 9/1994 | Reichen et al. | 56/249 |
| 5,412,931 | 5/1995 | Reichen et al. | 56/199 |
| 5,412,932 | 5/1995 | Schueler . | |
| 5,459,984 | 10/1995 | Reichen et al. | 56/7 |
| 5,533,326 | 7/1996 | Goman et al. | 56/7 |
| 5,628,169 | 5/1997 | Stiller et al. | 56/7 |
| 5,787,695 | 8/1998 | Nishioka | 56/15.1 |
| 6,032,441 | 3/2000 | Gust et al. | 56/7 |

*Primary Examiner*—Thomas B. Will
*Assistant Examiner*—Arpad Fabian Kovacs
*Attorney, Agent, or Firm*—Arthur J. Hansmann

[57] ABSTRACT

A reel-type lawn mower and tractor assembly which includes a pivotally-mounted lift arm on the tractor. A lawn mower is pivotally attached to the laterally extending end of the lift arm and is caster-connected relative to the lift arm by a device of an intervening link which is angulated to be at one elevation at the top of the mower and at a lower elevation to the rear of the mower where the connection is made with the tractor lift arm.

12 Claims, 5 Drawing Sheets

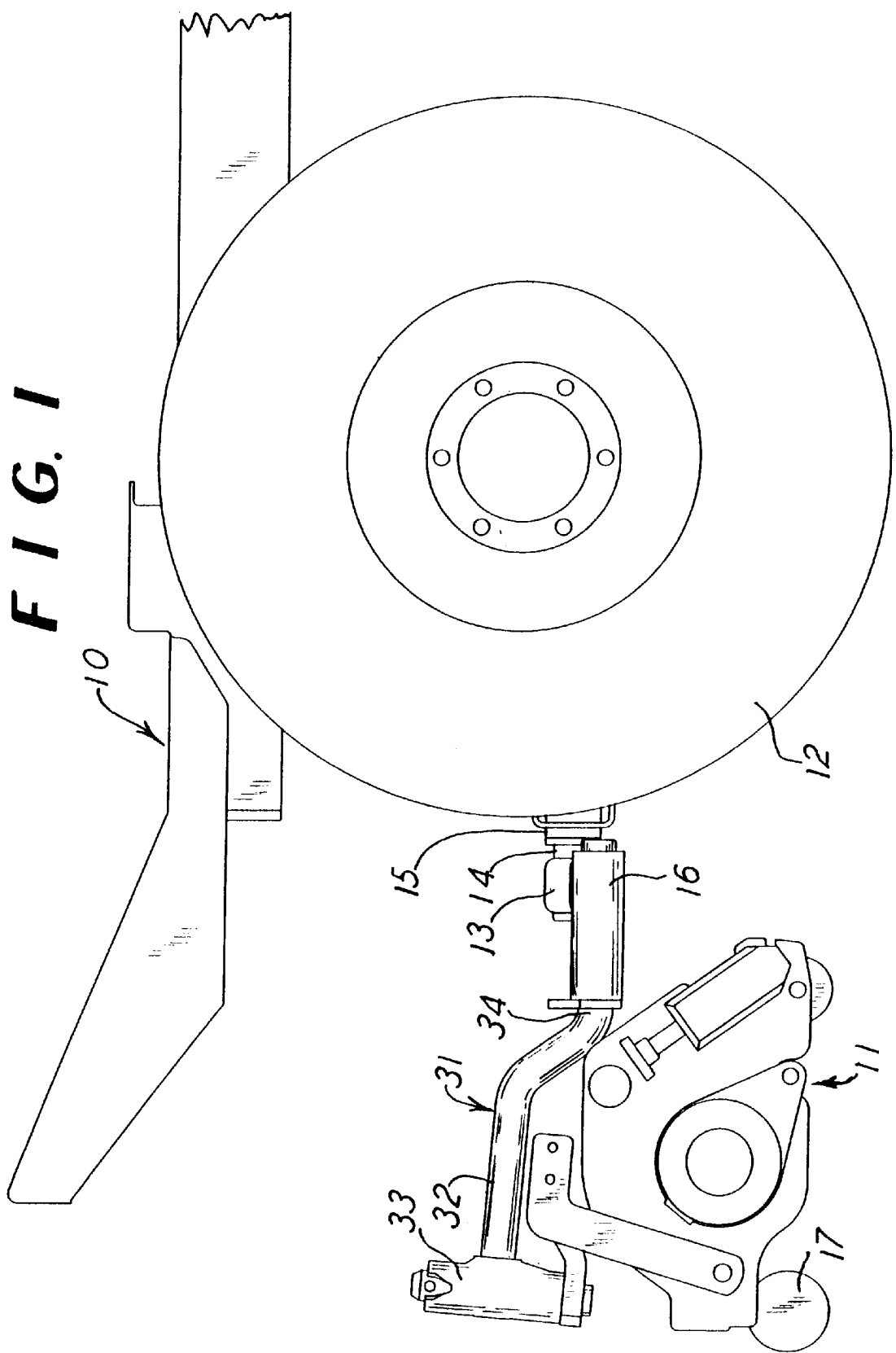

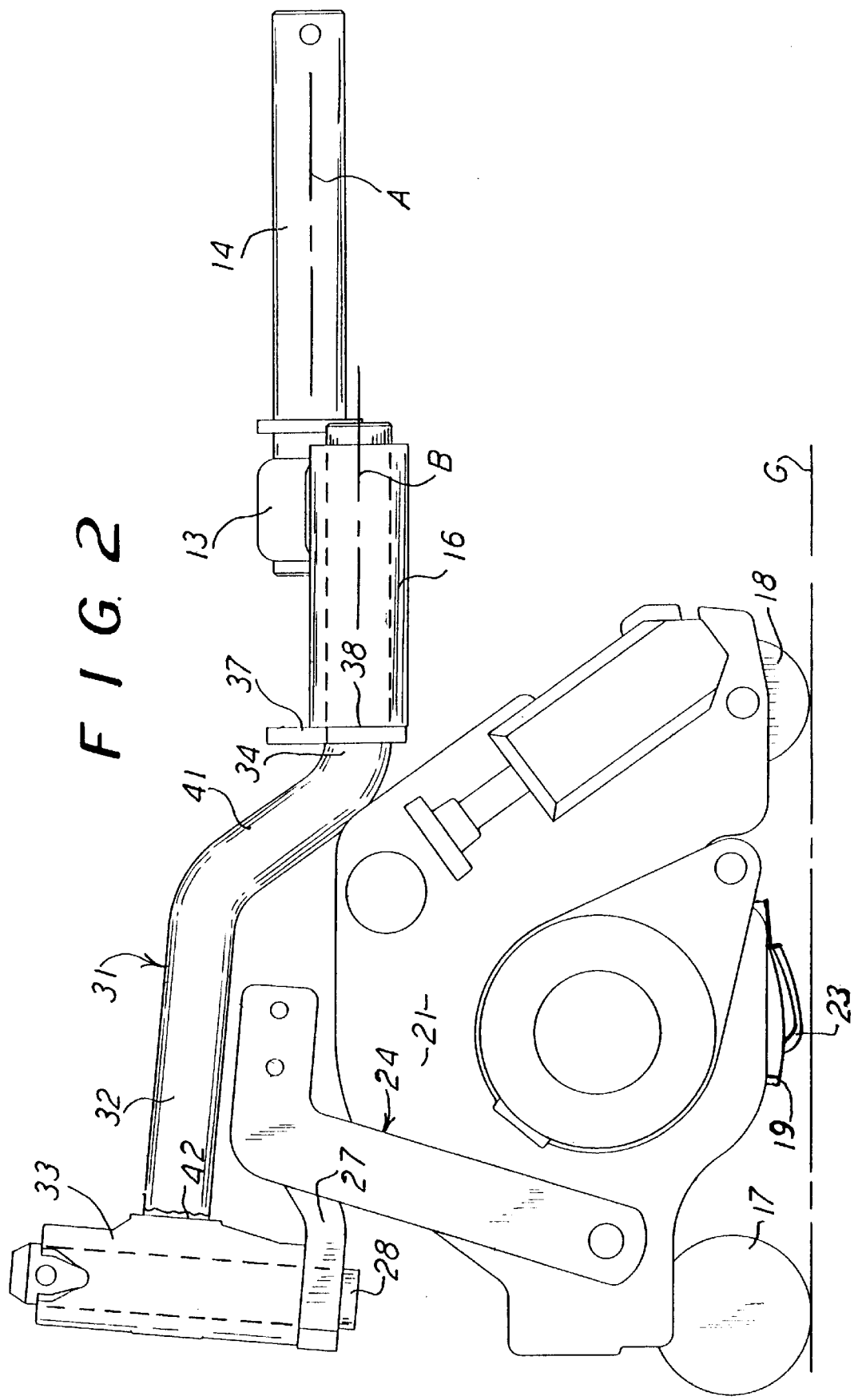

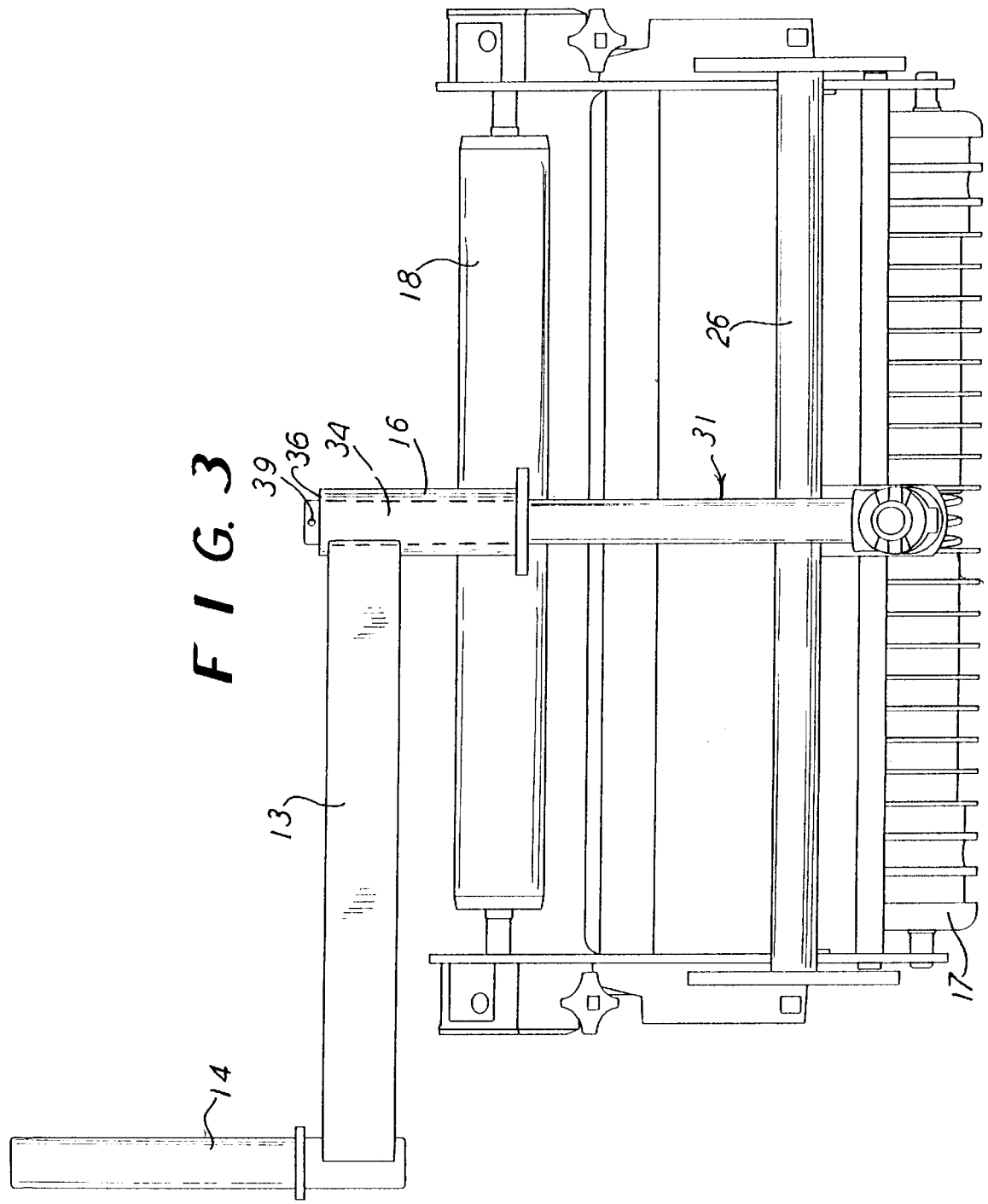

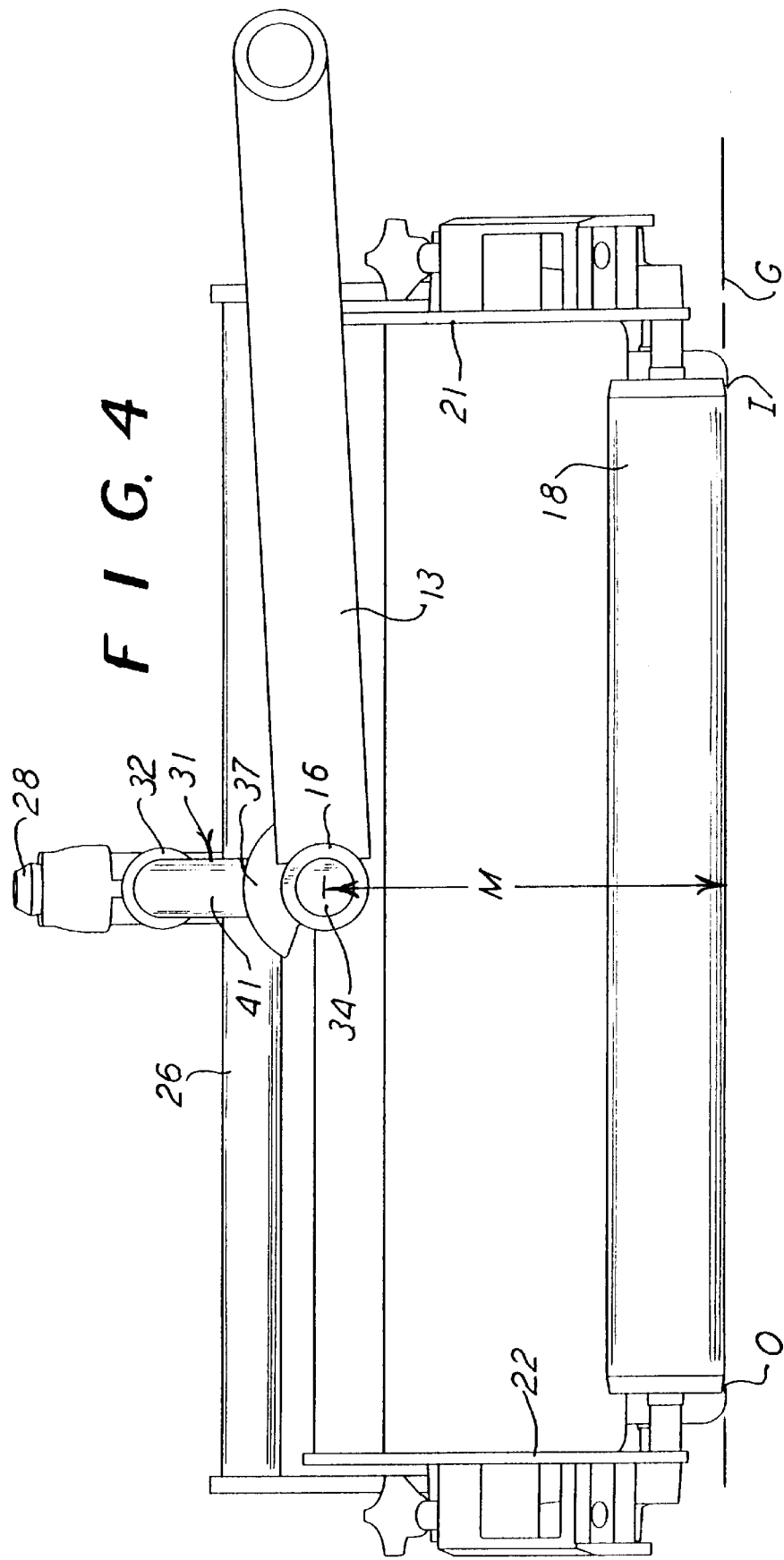

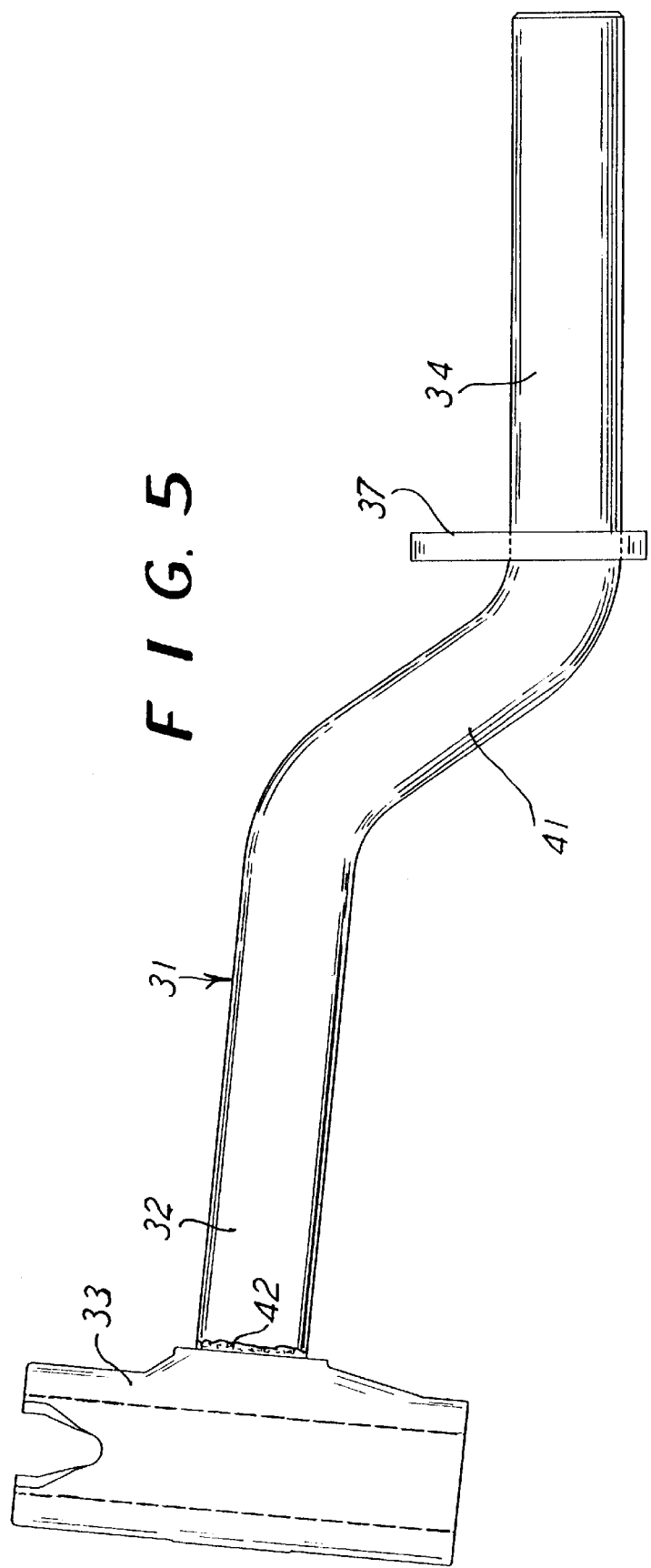

REEL-TYPE LAWN MOWER AND TRACTOR ASSEMBLY AND METHOD FOR REDUCING LATERAL TILTING MOMENT ON THE MOWER

This invention relates to a reel-type lawn mower and tractor assembly, and, more particularly, it relates to attaching a reel-type lawn mower to the lift arm of a tractor.

BACKGROUND OF THE INVENTION

Reel-type lawn mowers mounted on tractor lift arms are well known in this art. It is common to have the tractor with a plurality of lift arms extending from the frame of the tractor and with the lift arm extending laterally and articularly supporting a reel type lawn mower. With that arrangement, the lawn mower is propelled by the tractor and can be moved up and down relative to the ground and also to a transport position, and the lift arm connection is such that the mower will also automatically ride up and down according to the undulations of the ground itself.

It is also common to have the reel particularly related to the lift arm itself so that the reel can be propelled in a castering action, that is, it can be pulled through its mowing function, and thus the reel will steer in accord with the moving direction of the tractor. Still further, it is common to have the reel interconnected with the tractor so that the reel can tilt from side to side and thereby also continue to track according to the grade of the ground over which it is moving.

In those prior arrangements, when the assembled tractor and reel mowers are making a turning action, one side of the reel tends to force itself into the turf while the other side will respond and rise above the turf. In that action, the grass is unevenly mowed, and the reel itself is forced downwardly into the turf throughout the turning action of the tractor and its reel. That is, the tractor lift arm extends laterally of the tractor, and thus laterally of the forward movement direction of the tractor, and it is that lateral lift arm that pushes laterally on the reel during the turning action, and that push creates the tendency for the reel to become angled or tilted, rather than parallel, relative to the ground line.

Accordingly, it is an object of this invention to reduce the tendency of the tractor-mounted reels to force downwardly onto the ground and thereby tend to ride up on one side of the reel when the assembled tractor and reel is making a turn. In the present invention, the aforementioned object is accomplished by providing a low connection point between the tractor lift arm and the reel and thereby the connection point it at a low elevation which does not cause the reel to unduly tip or move onto only one side in the course of the turning action. That is, the low connection provides a small moment arm from the tractor to the reel, and thus the reel tends to remain parallel with the ground on which it is riding and during the course of the turning action.

Still further, the present invention accomplishes the aforementioned and it does so with the particular connection at the forward location of the reel where that connection is in a caster arrangement, as desired, and the tractor and reel assembly still reduce the lateral force and moment effective between the tractor and the reel in the course of the turning or steering action mentioned. In that caster connection, the caster connection remains centered, relative to the reel, and substantially vertical, even through the rise and lowering of the reel in mowing over undulations on turf, and those features are also true during the lifting of the reel by the lift arm.

The arrangement is such that the reel is connected in relation to a horizontally disposed pivot axis at the end of the lift arm, and there is an offset link extending forwardly to the front vertical plane of the reel and at an elevation higher than the horizontal pivot elevation, all to achieve the aforementioned objectives.

BRIEF DESCRIPTION OF THE DRAWINGS

FIG. 1 is a side elevational view of a fragment of a tractor with a reel-type mower attached thereto.

FIG. 2 is an enlarged elevational view, similar to FIG. 1, except for the showing of the tractor.

FIG. 3 is a top plan view of most of the showing of FIG. 2.

FIG. 4 is a rear elevational view of FIGS. 3 and 4.

FIG. 5 is an enlarged side view of a part shown in FIG. 1.

DETAILED DESCRIPTION OF THE PREFERRED ASSEMBLY AND METHOD

FIG. 1 shows a fragment of a front end of a tractor generally designated 10, and of a reel-type lawn mower generally designated 11 and attached to the tractor. The tractor has its usual chassis, including the shown frame 15 and the front wheel 12. Also, there is the usual mower lift arm 13 pivotally mounted on the tractor and extending laterally thereof relative to the fore-and-aft direction of movement of the tractor. FIG. 2 shows that the arm 13 has a member 14 which is pivotally attached to the tractor for movement about the axis "A". The laterally extending end of the arm 13 has a sleeve 16 affixed therewith, and thus the members 13, 14, and 16 are of one rigid assembly such that the usual powered up-and-down movement of the lift arm 13 causes pivot thereof about the axis "A", and it causes the sleeve 16 to move up and down on a radius about the axis "A", all in the conventional manner. It will also be understood that there would be a plurality of arms 13, each of which supports its own reel-type mower 11 so that there is a gang mower arrangement, such as with several or more odd number of mowers liftably attached to the tractor 10.

The mower 11 is a conventional reel-type mower which has a forwardly disposed ground-supported roller 17 and a rearwardly disposed ground-supported roller 18, both of which roll on the ground line designated "G". Also, there is a conventional mowing reel 19 included in the mower which also has side frame pieces 21 and 22 which are actually at the opposite left and right sides of the mower 11. That conventional mower also includes the usual reel-driving hydraulic motor (unshown) at one side of the reel and a conventional counterweight (unshown) at the other side of the reel. Further, FIG. 2 shows the mower bed knife 23 which co-acts with the reel 19 for mowing the grass in the conventional manner. In the mower shown herein, the grass clippings can be directed forwardly of the mower 11, that is, leftwardly thereof as viewed in FIGS. 1 and 2, if and when desired.

The mower 11 also has a yoke assembly 24 which connects to each of the mower side frame pieces 21 and 22 and extends therebetween through the yoke piece 26. A bracket 27 is affixed to the yoke piece 26 centrally of the fore-and-aft plane of the mower 11 and it extends forwardly relative to the mower forward direction of mowing. The bracket 27 presents a substantially vertical post 28 affixed thereto and extending upwardly from the bracket 27, as seen in FIG. 2.

The arrangement to this point of the description is such that with a forwardly exerted force on the post 28, the mower 11 is moved forwardly in a caster-type action such that the castering occurs about the upstanding longitudinal axis through the elongated post 28, and it will be noted that that axis is shown slightly off vertical and tilted slightly rearwardly at the top thereof.

A connecting link 31 extends from the lateral end of the tractor lift arm 13 and to the castering post 28. The link 31 has a forwardly extending end 32 to which a sleeve 33 is rigidly connected to extend substantially upwardly and thereby telescope over the post 28. That is, the sleeve 33 is pivotally associated with the post 28 so that the post 28 can rotate or pivot about its upright longitudinal axis within the sleeve 33, and thus there is a steering action for the mower reel 11. Also, the telescopic relationship between the post 28 and the sleeve 33 is elongated so that when the lift arm 13 is positioned up or down, the sleeve 33 is likewise moved up or down and there is stability from the sleeve 33 to the post 28 and on through to the mower itself.

The forward end 32 of the link 31 is substantially horizontally extended, as seen in FIG. 2, and there is a link rearward end 34 which is horizontally extended along the horizontal axis designated "B". The elongated sleeve 16, being affixed to the lateral end of the lift arm 13, telescopically receives the link rear end 34 which is axially restrained within the sleeve by means of a flange 37 affixed along the length of the link 31 and engaging forward edge 38 of the sleeve 16. Also, there is a retaining pin 39 at the sleeve rear edge 36, and the pin 39 extends through the link 31 and abuts the rear edge 36, all to hold the link 34 axially relative to the sleeve 16.

The link 31 is angulated along its length which extends from the link forward end 32 and to the rearward end 34, which ends, as mentioned, are substantially parallel to each other, while the intermediate portion 41 is substantially at a 45-degree angle.

Throughout, the link 31 is effectively elongated with the ends 32 and 34 offset relative to each other, and the link is of a circular cross sectional shape throughout its length. Thus, the link 31 is pivotal or rotatable within the sleeve 16, and it retains its angulated orientation shown and does so by virtue of the rigid connection at 42 between the link forward end 32 and the upright sleeve 33. Such connection may be a welded connection whereby the sleeve 33, and thus the link 31, retain their side-elevational orientation as viewed in FIG. 2, and they remain in the vertical plane in the forward direction of mowing.

It will also now be seen and understood that the elevation of the forward link end 32 is greater than the uppermost elevation of the mower 11 and it extends above and over the mower 11 and in the upright fore-and aft central plane of the mower. It will also be noticed that the link rear end 34 is at an elevation substantially below the elevation of the link forward end 32, and FIG. 4 shows that distance designated "Md" from the ground line and up to the axis of the link end 34. That lower elevation location is where the lateral end of the lift arm 13 is pivotally connected through the sleeve 16 to the link 31. With that arrangement, there is a substantial lessening of the tendency of the mower outward end designated "O", in FIG. 4, to become embedded in the ground when the mower is making a turn to the left, as viewed in FIG. 4. Likewise, that arrangement is such that there is a lessening of the tendency for the mower inner end designated "I" to rise above the ground level upon that turning action generated by the tractor and imposed upon the mower 11. As such, it is different from the prior mowers where the intervening link between the lift arm of the tractor and the mower itself is horizontally disposed throughout its length, rather than lower to the elevation designated "M" and that elevation in this invention is lower than the uppermost elevation of the mower 11 itself.

The method aspect of this invention is inherent in the aforementioned description. Also, the method includes the method step of applying the lateral force from the tractor to the lawn mower at a elevation lower than that of the elevation of the caster connection for the lawn mower, which connection is on the central axis of the length of the link end 32. FIG. 4 shows the lower elevation designated "M", which is on the central axis of the length of the end 34, and it also shows that the link 31 is formed with its two offset ends 32 and 34, and is disposed on the vertical center plane of the mower 11 relative to its forward direction of mowing. Overall, the particular connection between the tractor and the mower is such that there is the castering connection which includes the post 28. There also is the low elevation connection which includes the link end 34. The tractor, through the arm 13, applies the lateral force to the mower, relative to the mower mowing direction, and also relative to the forward movement of the tractor, to thus reduce the undesirable side-to-side tilt of the mower, as discussed in connection with side points "O" and "I" of FIG. 4.

Throughout, the lateral force applied at the link end 34, when in the mowing mode, is at a location of only minimal elevation from the ground, and thus there is only minimal lateral torque applied to the mower 11.

FIG. 5 shows the link 31 with its lower and rearward end 34 relative to the higher and forward end 32 which is suitably caster-connected to the mower 11. The showing is that the link 31 lies entirely in one vertical plane which is central with the mower 11 and the link 31 has the two ends 32 and 34 which are offset from each other.

What is claimed is:

1. In the assembly of a tractor and a lawn mower supported on a mower lift arm on the tractor and with said lift arm presenting a pivot axis extending only along a vertical plane disposed in a fore-and-aft direction of the tractor movement, the improvement comprising:

the lawn mower being a reel-type mower and having a ground-supporting member for supporting said mower on the ground for movement in a forward mowing direction and having an attachment merger disposed on said mower at a first elevation above the ground, an elongated link having a length and one end connected to said attachment member and with the length of said link extending exclusively and entirely in said vertical plane and said link extends over said mower and rearwardly relative to the forward direction and to a rearward location, the rearward location of said link being disposed at a second elevation which is lower than said first elevation, and said rearward location of said link being pivotally connected to said lift arm at said pivot axis for both forward mowing movement and lifting of said mower as imposed by said tractor.

2. The assembly as claimed in claim 1, wherein said attachment member and said one end of said link are pivotally related together and are located in advance relative to the forward movement and said attachment member and said link include means arranged to present a caster action in the forward mowing movement of said mower.

3. The assembly as claimed in claim 1, wherein
said rearward location of said link extends to a location rearwardly of said mower and with said second elevation being lower than an uppermost elevation of said mower.

4. The assembly as claimed in claim 1, wherein
said link is angulated along its length and has both its one end and its end in the rearward location both disposed substantially horizontally and there is an intermediate length along the length of said link which is offset and integral with both said ends.

5. The assembly as claimed in claim 4, wherein
said link includes two substantially forty-five degree angles therein for presenting said offset.

6. In a reel-type lawn mower operationally attached to a tractor for movement over ground, the improvement comprising,
a lift arm mounted on the tractor and extending to one side of the tractor and presenting a pivot axis disposed at an elevation above the ground and oriented in a fore-and-aft direction of tractor movement,
a yoke attached to the reel-type lawn mower and extending end-to-end of the mower and having an upstanding post centrally and forwardly located relative to a forward mowing direction of the mower,
a mower ground support on the mower for facilitating the forward direction of movement of the mower,
a link having a rearward end, relative to the forward mowing direction, pivotally connected to said lift arm and with said link extending from said lift arm in the forward mowing direction and being pivotal about said pivot axis at said elevation of said pivot axis and having a forward end, relative to the forward mowing direction, and with said ends being vertically offset relative to each other,
the forward end of said link being pivotally connected with said upstanding post and being arranged to provide a caster connection between said link and the mower for steering the mower in its forward direction of movement, and
said link being disposed to have an elevation at said connection with said post greater than said elevation of said pivot axis, for minimizing lateral tilting moment imposed by said tractor onto said mower in making turns.

7. The reel-type lawn mower operationally attached to a tractor as claimed in claim 6, wherein
said link is angulated along its length and has its two said ends disposed in positions substantially parallel to each other in one vertical plane extending along said pivot axis and said link has an intermediate length angled between said ends and joined therewith and arranged to present one continuous length of said link.

8. The reel-type lawn mower operationally attached to a tractor as claimed in claim 7, wherein
said elevation of said axis is disposed lower than an uppermost elevation of the mower.

9. In a method of propelling a reel-type lawn mower which is particularly attached to a tractor, the steps comprising:
arranging the lawn mower with an attached upstanding post disposed to extend in a vertical plane in a directly forward mowing direction of movement and centrally and forwardly of the lawn mower relative to the mowing direction of movement of the lawn mower and thereby arranging said post for castering propulsion of the lawn mower upon movement of said post,
connecting a first end of a link to said post in a pivotal connection and at a first elevation for pivot movement of said mower in a horizontal plane and having said link extend rearwardly of and over the lawn mower in a second end of said link,
connecting the rearwardly extending second end of said link to the tractor in a pivotal connection and at a second elevation and by means of a lift arm pivotally mounted on the tractor and extending laterally thereof relative to the forward direction of operational movement of the tractor, and
disposing the pivotal connections to have said second elevation at an elevation lower than that of said first elevation and thereby imposing from said lift arm and upon the lawn mower, when the lawn mower is on the ground, a lateral force at an elevation lower than an uppermost height of the lawn mower.

10. The method of propelling a reel-type lawn mower as claimed in claim 9, including the step of:
forming said link to have said two ends offset from each other along the length of said link to thereby achieve said lower elevation at said lift arm, and
disposing both said link ends entirely on said vertical plane.

11. In a method of controlling the position of a lawn mower from a tractor to which the lawn mower is particularly attached to a tractor arm with a castering connection to the lawn mower, at an elevation above the ground being mowed, for pulling the lawn mower in a forward direction of mowing, and wherein the particular attachment includes a link pivotally attached to the tractor arm on a pivot axis extending only along a vertical plane in the fore-and-aft direction of tractor movement and at an elevation whereby turning motion of the tractor produces a force on the lawn mower in the direction lateral of the forward direction and thereby induces undesirable side-to-side tilting of the lawn mower relative to the supporting ground, the improvement comprising the method steps of:
disposing said link exclusively and only to extend along said vertical plane, and
positioning an elevation of said pivot axis to a position which has a lower elevation than that of the castering connection when mowing to thereby reduce the tilting moment created by the tractor arm forcing laterally on the lawn mower and thus reduce the aforesaid undesirable tilt of the lawn mower.

12. The method of controlling the position of
a lawn mower from a tractor, as claimed in claim 11, including the steps of:
forming the link to have two ends vertically offset from each other on said vertical plane along the length of the link and to have the ends respectively included as part of the castering connection and as part of the pivotal attachment, and
placing the link with its entire length extending exclusively along said vertical plane to thereby achieve the lower elevation at the pivotal attachment location when the link is in its operative position for mowing.

* * * * *

UNITED STATES PATENT AND TRADEMARK OFFICE
CERTIFICATE OF CORRECTION

PATENT NO. : 6,131,379
DATED : Oct. 17, 2000
INVENTOR(S) : Byron N. Ehn, Jr.

It is certified that error appears in the above-identified patent and that said Letters Patent are hereby corrected as shown below:

Col. 3, line 55, " "Md" " to -- "M" --;

Col. 4, line 45, "merger" to --member--;

Col. 4, line 16, and Col. 6, line 35, "particular" to --articular--;

Col. 5, line 61, and Col.6, lines 31 and 32, "particularly" to --articularly--.

Signed and Sealed this

Eighth Day of May, 2001

Attest:

NICHOLAS P. GODICI

*Attesting Officer*   *Acting Director of the United States Patent and Trademark Office*